Jan. 26, 1971   A. HERSHLER   3,557,619
HUMIDITY MEASURING METHOD AND APPARATUS
Filed March 17, 1969
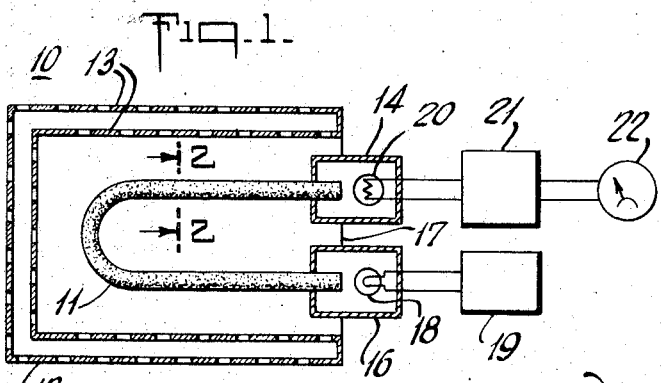
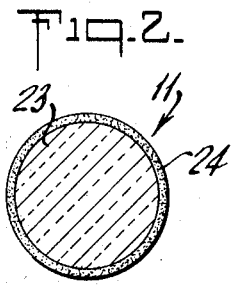
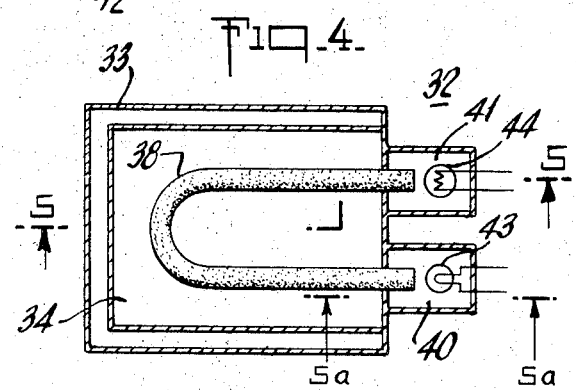
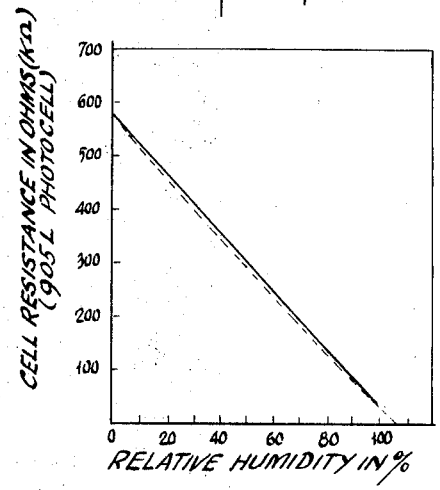
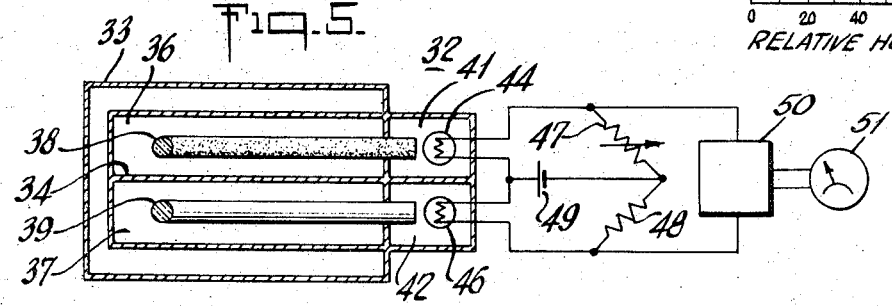
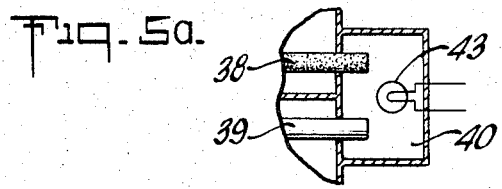
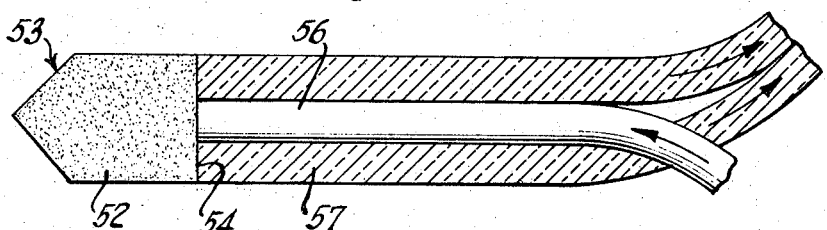
INVENTOR
ABE HERSHLER
BY Stanley Wolder
ATTORNEY

United States Patent Office 3,557,619
Patented Jan. 26, 1971

3,557,619
HUMIDITY MEASURING METHOD AND APPARATUS
Abe Hershler, Flushing, N.Y., assignor to Phys-Chemical Research Corp., New York, N.Y., a corporation of New York
Filed Mar. 17, 1969, Ser. No. 807,754
Int. Cl. G01n 21/22
U.S. Cl. 73—336.5                      22 Claims

ABSTRACT OF THE DISCLOSURE

A humidity measuring method and apparatus comprises a sensing member including a radiation light transparent non-hygroscopic, water-insoluble dielectric substrate, such as DVB cross-linked polystyrene, having a radiation transparent conducting ion-exchange surface layer of almost equal or relatively lower refractive index, such as the surface sulfonated polystyrene in a lithium state or a coating having a conductivity varying with humidity. Radiation is directed into the substrate with a component at approximately the Snell critical angle to the substrate layer interface and the phase or intensity of the light emerging from the substrate is a measurement of the ambient humidity. The evanescent radiation lost through the interface at or near the critical angle is responsive to the conductivity of the conducting layer which is responsive to ambient humidity.

BACKGROUND OF THE INVENTION

The present invention relates generally to improvements in measuring instruments and methods and it relates more particularly to an improved method and apparatus for measuring relative humidity.

The instruments heretofore employed or proposed for the direct measurement of relative humidity possess numerous drawbacks and disadvantages. The transducers employed are generally mechanical or electrical in nature. The mechanical humidity measuring devices are typified by resort to dimensional variations of human hair, animal membranes and various cellular fibers in response to variations in the ambient relative humidity. These mechanical devices are characterized by very low speed of response, inaccuracy, instability, large hysteresis, high temperature coefficients, unreliability and by their bulk and delicate nature. The electrical type of relative humidity type of measuring device, on the other hand, requires the use of high gain electrical networks due to basic limitations of the sensor members generally employed and the electrical parameters which characterize these sensor members, and the problems encountered in their use and construction such as polarization at the sensor member electrodes and general surface fragility, both mechanical and electrical. These devices possess high hysteresis, large temperature coefficients and low temperature ranges, are subject to high humidity and condensation damage and cannot easily be miniaturized. The instruments heretofore employed in the direct measurement of relative humidity thus leave much to be desired.

SUMMARY OF THE INVENTION

It is a principal object of the present invention to provide an improved measuring instrument.

Another object of the present invention is to provide an improved method and apparatus for the measurement of relative humidity.

Still another object of the present invention is to provide an improved hygrometric measuring device which is highly reliable, simple and rugged.

A further object of the present invention is to provide a relative humidity measuring device of great accuracy, low hysteresis, rapid response and large temperature range of operation.

Still a further object of the present invention is to provide a device of the above nature characterized by its compactness and ease of miniaturization, high versatility and adaptability and low cost.

The above and other objects of the present invention will become apparent from a reading of the following description taken in conjunction with the accompanying drawing which illustrates preferred embodiments thereof.

The present invention, in a sense, is based on the discovery that when light or other radiation is directed through a radiation transparent and non-hygroscopic substrate and is incident at approximately the Snell critical angle on the interface of the substrate and a superimposed layer of a radiation transparent material of almost equal or relatively lower refractive index which layer has a conductivity which varies with an ambient condition which is to be measured, parameters of the radiation, its intensity and phase angle, vary with such conductivity and hence with the ambient condition.

What is meant by approximately the Snell critical angle is an angle which varies from the Snell critical angle between a fraction of a degree in the negative direction an a positive angle of 12°. The allowable variation from the Snell critical angle varies with the specific materials and particularly the conductivity of the surface layer. Where the surface layer possesses a relatively low electrical conductivity, the incident angle should be less, preferably within plus 3° of the Snell critical angle.

Accordingly the present invention contemplates the provision of an apparatus for measuring an ambient condition comprising a sensing member including a substrate transparent to a predetermined radiation and a superimposed layer, which may be integrally formed with the substrate, transparent to said radiation and having a conductivity responsive to said ambient condition, means for directing said radiation onto the interface of said substrate and layer at approximately the Snell critical angle thereto, and means responsive to a parameter of said radiation incident on said interface which responds to changes in the conductivity of said layer.

As applied to the measurement of relative humidity of an ambient medium the improved device comprises a sensing member including a substrate formed of a radiation transparent non-hygroscopic, water-insoluble dielectric material having spaced inlet and outlet light apertures, and a surface layer which may be deposited or integrally formed on said substrate of a radiation transparent material and an index of refraction almost equal or less than that of said substrate and having an electric conductivity responsive to the relative humidity ambient thereto, a source of radiation directed through said inlet aperture with at least a fraction thereof being incident on the interface of said substrate and conductive layer at approximately the Snell critical angle, and a photosensitive element exposed to the radiation emerging from said outlet aperture. In its preferred form the sensing member substrate is formed of divinylbenzene cross-linked polystyrene, the electric conducting, humidity responsive layer being formed by sulfonating a face of the substrate to form a water insoluble ion-exchange surface layer in the hydrogen state; subsequent treatment with a metal salt, for example, lithium, changes the insoluble ion exchange resin layer to the lithium ion state. The sensing member is advantageously in the form of a rod, one end of which is exposed to a light source and the other end of which faces a photocell of the photoconductor or photovoltaic type. A suitable meter or network measures the voltage or resistance across the photocell as an indication of the relative humidity.

The operation of the improved device depends on the phenomenon that when light or other appropriate radiation passes from a high refractive medium to an equal or lower refractive medium at an incident angle at or near the critical Snell angle an evanescent wave is produced in the rarer medium just beyond the interface to a distance of only several wavelengths; the degree of dissipation (absorption) of the evanescent wave in the rarer medium is a direct function of the electrical conductivity of the rarer medium. The intensity and phase angle of the reflected light within the higher refractive medium is thus also a function of this conductivity, since the evenescent wave energy is a substantial portion of the reflected light energy. In the case of zero conductivity, zero evanescent wave energy is dissipated and the reflected light is total (provided the incident radiation is at the Snell critical angle). When the conductivity is high (let us say at 100% RH or water immersion) a substantial portion of the evanescent wave energy is absorbed and the reflected light is thereby reduced. The functional relationship between reflected radiation and rarer medium electric conductivity may be positive or negative depending upon the magnitude of the absorption coefficient (conductivity level). Hence, a measurement of the intensity of the evanescent light in the low refractive medium or the intensity of the light reflected back into the high refractive medium thereby is a function of the electric conductivity of the low refractive index medium. Accordingly where the electric conductivity of the low refractive medium is a function of the ambient relative humidity, the light values are a measurement of such relative humidity. Similarly, the change in the phase angle of the light incident on the interface is likewise a measurement of this parameter.

The improved device overcomes the numerous drawbacks and disadvantages of the earlier devices. It is reliable, simple, compact and capable of a high degree of miniaturization and very accurate. It possesses a very rapid response, it exhibits very little hysteresis and is highly versatile and adaptable.

BRIEF DESCRIPTION OF THE DRAWING

FIG. 1 is a longitudinal sectional view of a relative humidity measuring device embodying the present invention;

FIG. 2 is an enlarged sectional view taken along line 2—2 in FIG. 1;

FIG. 3 is a graph illustrating the variation in resistance of a photocell associated with the improved device plotted against relative humidity;

FIG. 4 is a fragmentary sectional view of another embodiment of the present invention;

FIG. 5 is a sectional view taken along line 5—5 in FIG. 4;

FIG. 5a is a sectional view taken along line 5a—5a in FIG. 4; and

FIG. 6 is a longitudinal sectional view of another embodiment of the present invention.

DESCRIPTION OF THE PREFERRED EMBODIMENTS

Referring now to the drawing and particularly FIGS. 1 and 2 thereof which illustrate a preferred embodiment of the present invention, the reference numeral 10 generally designates the improved device for use in the measurement of ambient relative humidity. The device 10 includes a U-shaped sensor member 11 formed of a circular rod and having a bending radius not less than 4× the diameter of the rod and housed in an easily fluid permeable opaque light shielding casing 12 of any suitable construction and configuration. In the illustrated form the casing 12 is double walled, the parallel walls forming the casing having non-aligned offset openings 13 formed therein to expose the sensor member 11 to the ambient surroundings or atmosphere while preventing the entrance of light. The surfaces of the casing walls are advantageously black and non-reflecting.

A pair of opaque walled housings 14 and 16 are supported by a casing end wall 17 the ends of the sensor member 11 projecting into respective housings 14 and 16 and being in light tight communication therewith. An electric lamp 18 is located in the housing 16 confronting a polished end face of the sensor member 11 and is connected to a suitable energizing source 19, for example a battery. A photocell 20 which may be a photoconductor, photovoltaic cell, photo-diode or photo-transistor for extreme sensitivity, or the like is located in the housing 14 and confronts a corresponding polished end face of the sensor member 11. The photocell 20 is connected by way of any suitable well known network 21 to an electric meter 22 to provide a measurement of the resistance or voltage of the photocell 20 if the photocell is a photoconductor or photovoltaic cell respectively.

The sensor member 11 includes a core of substrate 23 formed of a light transparent non-hygroscopic dielectric material, and an outercoating or layer 24 formed of a light transparent material having an equal or lower index of refraction than that of the substrate 23 and having an electrical conductivity, either ionic or electronic, which varies with the ambient relative humidity. The layer 24 is advantageously hygroscopic and very thin and may be integrally formed with the substrate 23 by the treatment thereof or may be a separately applied coating. A sensing member which has been found highly effective is one in which the substrate is a 2% to 25% crosslinked polystyrene with, for example, divinylbenzene, the surface of which is sulfonated to produce an ion-exchange layer in the hydrogen ion state or then treated with a salt solution, for example, lithium chloride to put the surface layer in a lithium or corresponding ion state.

In operation, the casing house sensor 11 is located in the environment whose relative humidity is to be measured. This environment may be gaseous, for example atmospheric, liquid, in which case the liquid should preferably have an index of refraction less than that of the layer 24, or a solid material. The layer 24 will attain a conductivity which varies directly with the relative humidity and the amount of light which leaves the substrate 23 through the interface thereof with the layer 24 will vary directly with the conductivity of the layer 24. Accordingly an increase in the ambient relative humidity results in a decrease in the amount of light transmitted by the substrate 23 from the lamp 18 to the photocell 20 and a decrease in relative humidity results in an increase in such light. An opposite functional relationship may be obtained depending on the degree of layer conductivity. The light reaching the photocell 20 thus varies the resistance or voltage thereof as a function of the relative humidity whose value may be read directly on the meter 22.

In FIG. 3 there is illustrated a graph showing the variation of the resistance of a photoconductor 20 with relative humidity in a specific example of the present invention of the general nature of that desired above. In the subject example the sensor member 11 was a 2 inch long ⅛ inch diameter rod of Q200.5 cross-linked polystyrene rod having approximately 7% divinylbenzene cross-linking and being U-shaped with a cross arm of ½ inch radius. The shaped rod was sulfonated by immersion in concentrated sulfuric acid containing ½% silver sulfate catalyst for 10 minutes at 60° C., followed by immersion in 60% sulfuric acid solution for 15 minutes and then by immersion in 8% sulfuric acid solution for 15 minutes and then rinsed in deionized water. The rod was then immersed for 15 minutes in a concentrated lithium chloride solution and thereafter rinsed in deionized water. The sensor member layer 24 was now in a lithium ion state. Both ends of the sensor member 11 were ground and polished to high transparency. The lamp 18 was a GE 246 miniature lamp (0.2 mean spherical candlepower) and the photocell 20 was a 905L cadmium sulfide photoconductor cell.

As can be seen from the graph the resistance to relative humidity response at 25° C. is, in this case, substantially linear, varying from about 520,000 ohms at about 10% relative humidity to about 35,000 ohms at 100% relative humidity. The hysteresis is less than 2% at 50% relative humidity for a full excursion from 0–100% relative humidity. The maximum temperature coefficient is less than 0.2% RH per degree C. and is negative. It is important to note that the frost point and dew point present different resistances, a highly useful characteristic. In addition the specific sensor member 11 is effective over a wide temperature range, −60° C. to 150° C., which may be increased.

The device 10 described above may be modified and altered in many ways. The sensing member substrate may be of any desired shape and may be formed of any suitable material which is transparent to the employed radiation and is advantageously a non-hygroscopic dielectric. The sensor member may be in the shape of a prism, block, sheet, bar or rod of various cross-sections which may be linear, U-shaped, helical or other configuration or the sensor member may be formed of a miniaturized filament or a filament bunch. It is important to note that as the sensor diameter is reduced, for example below 0.050 inch, the evanescent sensing wave increases so that miniaturization is accompanied by improved sensitivity and performance. It may be a synthetic organic polymeric resin, glass, or other light transparent materials such as quartz, fluorite and the like, or materials transparent to the radiation employed. The layer 24 may be an integrally formed or applied ion exchange resin in an ionic state, a coating or film of a hygroscopic salt such as, for example, lithium chloride, or such a salt in a suitable substrate adherent binder, or the like. The coating 24 should be transparent to the radiation, advantageously have a refractive index less than that of the substrate 23 and vary in conductivity with the measured condition of relative humidity.

Although the means for exposing the interface of the sensor substrate 23 and layer 24 to radiation has been illustrated as comprising an electric lamp the source of radiation may be a light source which may be the ambient light, an incandescent or gas discharge lamp, a semiconductor light generator, a radioactive material containing self energizing fluorescent light source, or any other source of light visible or otherwise, such as infrared or ultraviolet, or a source of other electromagnetic radiation, for example, radio microwaves. The radiation may be coherent and may be parallel polarized with increased device sensitivity. The photocell 20 may be a photovoltaic cell, a photoconductor, a photodiode, a phototransistor or other light or radiation responsive device.

In FIGS. 4 and 5 of the drawing there is illustrated a compensated relative humidity measuring device 32 embodying the present invention. The device 32 includes a light shielding fluid permeable casing 33 divided by a fluid permeable light opaque partition 34 into two compartments 36 and 37. Housed in the compartment 36 is a sensor member 38 similar to the sensor member 11 specifically described above, and housed in the compartment 37 is a compensating member 39 similar in composition, shape and dimensions to the sensor member 38 but formed uniformly of the substrate and lacking the coating layer.

The members 38 and 39 are parallel with a pair of proximate ends thereof projecting into a common light tight chamber 40, the other end of sensor member 38 projecting into a light tight chamber 41 and the other end of compensating member 39 projecting into a light tight chamber 42.

A lamp 43 is centrally located in the chamber 40 and equally illuminates the confronting end faces of members 38 and 39, a photoconductor 44 is housed in chamber 41 and confronts the end face of sensor member 38 and a similar photoconductor 46 is housed in chamber 42 and confronts the end face of compensating member 39.

The photoconductors 44 and 46 are connected in series and the series connected variable resistor 47 and resistor 48 are connected between the unjoined ends of the photoconductors 44 and 46 to form a bridge network. A voltage source 49 is connected between one pair of corners of the bridge network and the other corners thereof are connected to the input of a suitable amplifier 50 whose output is connected to a meter 51.

The operation of the device 32 is similar to that first described except for the action of the member 39 which compensates for variations in the light incident on photoconductor 44 consequent to parameter variations other than relative humidity, such as ambient temperature and the like.

Referring now to FIG. 6 of the drawing which illustrates another embodiment of the present invention which is highly suitable for use in many situations such as in places of low accessibility or the like. The improved device includes a block 52 of cylindrical or other suitable configuration having a tapered or conical outerface 53 and a flat transverse rear face 54. The block 52 is formed of a light or other electromagnetic radiation transparent non-hygroscopic dielectric material and is covered with a deposited or integrally formed layer of a light or other radiation transparent material having an electrical conductivity which varies with ambient humidity and an index of refraction equal to or less than that of the body of block 52. Advantageously the substrate defining body of block 52 is a 2% to 25% divinylbenzene cross-linked polystyrene treated, as above set forth, by sulfonation and other steps, to form an ion-exchange, water insoluble, surface layer.

A pair of coaxial fiber optic light guides extend to block rear face 54 and include an inner axial light guide 56 having an end face engaging block face 54 and an annular light guide 57 coaxial with and embracing light guide 56 and having an end face engaging block face 54. Light guides 56 and 57 are separated at a point remote from block 52 and reformed into respective separated light guides, the guide 56 being exposed at its free end face to a light source and the free end face of the guide 57 being directed to a photosensitive element.

The improved device last described is similar to that first described.

While there have been described and illustrated preferred embodiments of the present invention it is apparent that numerous alterations, omissions and additions may be made without departing from the spirit thereof.

What is claimed is:

1. An apparatus for measuring an ambient condition comprising a sensing member including a substrate transparent to a predetermined radiation and a surface layer transparent to said radiation and having an electrical conductivity responsive to said ambient condition and an index of refraction not exceeding that of said substrate, means for exposing the interface of said substrate and layer to said predetermined radiation with at least a fraction of said radiation at an angle to said interface approximately equal to the Snell critical angle, and means responsive to a parameter of said radiation incident on said interface which responds to changes in the electrical conductivity of said layer.

2. The apparatus of claim 1 wherein said radiation is light, said radiation exposing means includes a light source and said radiation responsive means includes a photosensitive element.

3. The appartus of claim 2 wherein said sensing member includes light inlet and outlet apertures, said light source registering with said inlet aperture and said photosensitive element is exposed to light emerging from said outlet aperture.

4. The apparatus of claim 2 wherein said sensing member substrate includes spaced light inlet and outlet apertures, said light source registering with said inlet aperture and said photosensitive element is exposed to light emerging from said outlet aperture.

5. The apparatus for claim 1 wherein said substrate is formed of a dielectric material.

6. A hygrometric device comprising a sensing member including a substrate formed of a light transparent dielectric material having spaced inlet and outlet light apertures and a surface layer on said substrate of a light transparent material and an index of refraction not greater than that of said substrate and having an electrical conductivity responsive to the humidity ambient thereto, a source of light directed through said inlet aperture with at least a fraction thereof being incident on the interface of said substrate and conductive layer at approximately the Snell critical angle, and a photosensitive element exposed to the light emerging from said outlet aperture.

7. The device of claim 6 wherein said substrate is formed of a non-hygroscopic synthetic organic polymeric resin and said layer is an ion exchange resin integrally formed with said substrate.

8. The device of claim 6 wherein said substrate comprises a cross-linked polystyrene resin and said layer comprises a sulfonation product of said cross-linked polystyrene resin.

9. The device of claim 6 wherein said sensing member is in the form of an elongated rod with said apertures being disposed at opposite ends of said rod.

10. The device of claim 9 wherein said rod is U-shaped.

11. The device of claim 6 wherein said substrate comprises a filament bunch.

12. The apparatus of claim 6 wherein said light source comprises an electrically energized lamp in light communication with said inlet aperture.

13. The apparatus of claim 6 wherein said photosensitive element comprises a photoconductor.

14. The apparatus of claim 6 wherein said photosensitive element comprises a photovoltaic member.

15. The apparatus of claim 6 wherein said light source comprises a self energized light generator and said photosensitive element comprises a photovoltaic cell.

16. The apparatus of claim 6 including means shielding said sensing member from ambient light.

17. The apparatus of claim 6 wherein said substrate comprises glass.

18. The apparatus of claim 6 wherein said layer comprises an ion exchange film.

19. The apparatus of claim 6 wherein said layer comprises a hygroscopic salt.

20. The apparatus of claim 6 including a pair of fiber optic light guides extending from said sensing member and having the outer ends thereof communicating with said light source and said photosensitive element respectively.

21. The method of measuring an ambient condition comprising exposing to said ambient condition the surface of a radiation transparent material having an electrical conductivity responsive to said ambient condition and measuring an evanescent radiation effect of said material varying with said electrical conductivity.

22. The method of claim 21 wherein said material is responsive to ambient humidity and is in the form of a surface layer on a radiation transparent substrate having an index of refraction no less than that of said layer and said evanescent radiation measurement is performed by directing radiation through said substrate onto the interface thereof with said layer with at least a fraction thereof at approximately the critical Snell angle and measuring the radiation traversing said substrate as a measurement of said humidity.

References Cited
UNITED STATES PATENTS

| | | | |
|---|---|---|---|
| 3,051,038 | 8/1962 | Duke | 73—355 |
| 3,162,045 | 12/1964 | Kudelko | 73—355 |
| 3,299,306 | 1/1967 | Kapany | 250—227 |
| 3,350,654 | 10/1967 | Snitzer | 250—227 |

LOUIS R. PRINCE Primary Examiner

D. E. CORR, Assistant Examiner